US012462623B2

(12) United States Patent
Serrano et al.

(10) Patent No.: US 12,462,623 B2
(45) Date of Patent: Nov. 4, 2025

(54) SYSTEMS AND METHODS FOR FLEET LEVEL MAPPING OF FAULT CODE LOCATIONS

(71) Applicant: Caterpillar Inc., Peoria, IL (US)

(72) Inventors: Amanda Serrano, Bloomington, IL (US); Shane McBride, Denver, CO (US)

(73) Assignee: Caterpillar Inc., Peoria, IL (US)

( * ) Notice: Subject to any disclaimer, the term of this patent is extended or adjusted under 35 U.S.C. 154(b) by 265 days.

(21) Appl. No.: 18/327,627

(22) Filed: Jun. 1, 2023

(65) Prior Publication Data

US 2024/0312265 A1  Sep. 19, 2024

Related U.S. Application Data

(60) Provisional application No. 63/489,967, filed on Mar. 13, 2023.

(51) Int. Cl.
G07C 5/08 (2006.01)
G07C 5/00 (2006.01)

(52) U.S. Cl.
CPC ........... *G07C 5/0816* (2013.01); *G07C 5/008* (2013.01)

(58) Field of Classification Search
CPC .............................. G07C 5/0816; G07C 5/008
See application file for complete search history.

(56) References Cited

U.S. PATENT DOCUMENTS

| 8,275,508 | B1 | 9/2012 | Adams et al. | |
| 9,047,722 | B2* | 6/2015 | Kurnik | G07C 5/0808 |
| 9,697,485 | B2 | 7/2017 | Mason et al. | |
| 10,515,492 | B2 | 12/2019 | Mattern et al. | |
| 12,041,089 | B2* | 7/2024 | Deshmukh | H04L 67/562 |
| 2011/0130905 | A1 | 6/2011 | Mayer | |
| 2012/0017168 | A1 | 1/2012 | Mason et al. | |
| 2015/0100199 | A1* | 4/2015 | Kurnik | G07C 5/085 |
| | | | | 701/32.4 |
| 2015/0187088 | A1* | 7/2015 | Iwai | G06T 11/206 |
| | | | | 345/634 |

(Continued)

OTHER PUBLICATIONS

Written Opinion and International Search Report for Int'l. Patent Appln. No. PCT/US2024/016593, mailed Jun. 19, 2024 (12 pgs).

*Primary Examiner* — Rami Khatib

(57) ABSTRACT

A method for machine fault location mapping including: receiving fault event information for machines dispersed within a geographic region; receiving location information corresponding to the fault event information; receiving severity information corresponding to the fault event information, wherein the severity information includes an indication of high, medium, or low severity; and presenting on a display device a graphical user interface including: a map representing at least a portion of the geographic region; and at least one fault cluster indicator positioned on the map representing fault events that occurred on the machines located within a selected cluster distance; wherein the fault cluster indicator indicates the number of high severity events as a percentage of combined high and medium severity events as a corresponding portion of a ring and wherein the total number of fault events represented by the fault cluster indicator is numerically indicated in the center of the ring.

20 Claims, 9 Drawing Sheets

(56) References Cited

U.S. PATENT DOCUMENTS

| | | |
|---|---|---|
| 2016/0117059 A1 | 4/2016 | Folken et al. |
| 2018/0060149 A1 | 3/2018 | Flyax |
| 2018/0165890 A1* | 6/2018 | Buchholz ......... G08G 1/096716 |
| 2020/0394094 A1 | 12/2020 | Fountain et al. |
| 2022/0100595 A1 | 3/2022 | Shapiro et al. |
| 2022/0109696 A1* | 4/2022 | Deshmukh .............. H04L 43/06 |
| 2023/0055168 A1* | 2/2023 | Kaneko .................. G06Q 10/06 |

\* cited by examiner

SYSTEMS AND METHODS FOR FLEET LEVEL MAPPING OF FAULT CODE LOCATIONS

CROSS-REFERENCE TO RELATED PATENT APPLICATIONS

The present application claims priority to U.S. Provisional Patent Application No. 63/489,967 filed Mar. 13, 2023, which is hereby incorporated by reference in its entirety.

TECHNICAL FIELD

This patent application is directed to machine management, and more specifically, to mapping and clustering of machine fault code locations.

BACKGROUND

Managing a fleet of machines, such as excavators, bulldozers, haul trucks, etc., can be difficult especially as the number of machines and job locations grow. For example, fleet managers need the ability to visualize which machines in a fleet are experiencing fault codes, what kind of faults those machines are experiencing, and where those asset are located. While location data is provided when fault codes are reported, fault codes have traditionally been provided in a list view, with only an address link. Additionally, some mapping capabilities for faults at the fleet level are provided to assist a fleet manager in determining how to respond to a particular fault. This may be useful to identify problem assets, but it does not always allow fleet managers to easily understand why faults are occurring.

Efforts have been made to provide fleet visualization methods. For example, U.S. Pat. No. 10,515,492 to Mattern et al. (hereinafter "Mattern"), describes a data visualization method, wherein an aggregation circuit is structured to receive at least one of (i) vehicle data indicative of at least one operating characteristic of one or more vehicles from the one or more vehicles and (ii) technician data indicative of at least one diagnostic characteristic of the one or more vehicles representative of a technician servicing event. The data visualization circuit is structured to receive a display request for providing a graphical user interface to a user display device. The display request includes configurable options for providing the graphical user interface in a desired graphical format including the at least one of the vehicle data and the technician data.

Furthermore, U.S. Patent Application Publication No. 2016/0117059 to Folken et al. (hereinafter "Folken"), describes a user interface for a fleet management web portal for a manufacturer, operator, or user to manage a fleet of equipment and/or machines. The fleet of equipment and/or machines may be linked with the fleet management web portal and the manufacturer, operator, or user may access alerts and other information associated with the equipment and/or machines using an electronic device. The user interface is compatible with electronic devices of various sizes and enables a user to interact with information associated with the fleet of equipment and/or machines. While Mattern and Folken provide fault code information and mapping capabilities, they do not provide context for the fault codes that could help a fleet manager determine the cause of and an appropriate response to those faults.

Thus, there are still opportunities to improve on fleet level mapping of fault codes to help provide insights into potential causes of those faults. The example systems and methods described herein are directed toward overcoming one or more of the deficiencies described above and/or other problems with the prior art.

SUMMARY

In some aspects, the techniques described herein relate to a method for machine fault location mapping, the method including: receiving fault event information for a plurality of machines dispersed within a selected geographic region; receiving location information corresponding to the received fault event information; receiving severity information corresponding to the received fault event information, wherein the severity information includes an indication of high, medium, or low severity; and presenting on a display device a graphical user interface including: a map representing at least a portion of the geographic region; and at least one fault cluster indicator positioned on the map representing fault events that occurred on the plurality of machines located within a selected cluster distance; wherein the fault cluster indicator indicates the number of high severity events as a percentage of combined high and medium severity events as a corresponding portion of a ring and wherein the total number of fault events represented by the fault cluster indicator is numerically indicated in the center of the ring.

In some aspects, the techniques described herein relate to a method, wherein the graphical user interface further includes at least one fault marker that is located outside the selected cluster distance, wherein the fault marker includes a severity indicator.

In some aspects, the techniques described herein relate to a method, further including receiving a selection of the at least one fault marker and in response to receiving the selection of the at least one fault marker displaying the corresponding fault information overlayed on the map.

In some aspects, the techniques described herein relate to a method, wherein the fault information includes a machine identification, a total number of machine hours, and a fault code.

In some aspects, the techniques described herein relate to a method, wherein the graphical user interface further includes a listing of each fault event currently displayed on the map.

In some aspects, the techniques described herein relate to a method, wherein the fault event information, the location information, and the severity information are received from a corresponding one of the plurality of machines.

In some aspects, the techniques described herein relate to a method, wherein the fault event information corresponds to faults observed during a selectable time period.

In some aspects, the techniques described herein relate to a machine fault location mapping system, including: one or more processors; and one or more memory devices having stored thereon instructions that when executed by the one or more processors cause the one or more processors to: receive fault event information for a plurality of machines dispersed within a selected geographic region; receive location information indicating where one or more of the fault events occurred; receive severity information for the one or more fault events, wherein the severity information includes an indication of high, medium, or low severity; and present on a display device a graphical user interface including: a map representing at least a portion of the geographic region; and at least one fault cluster indicator positioned on the map representing fault events that occurred on the plurality of machines located within a selected cluster distance; wherein the fault cluster indicator indicates the number of high severity events as a percentage of combined high and medium severity events as a corresponding portion of a ring and wherein the total number of fault events represented by the fault cluster indicator is numerically indicated in the center of the ring.

In some aspects, the techniques described herein relate to a system, wherein the graphical user interface further includes at least one fault marker that is located outside the selected cluster distance, wherein the fault marker includes a severity indicator.

In some aspects, the techniques described herein relate to a system, further including receiving a selection of the at least one fault marker and in response to receiving the selection of the at least one fault marker displaying the corresponding fault information overlayed on the map.

In some aspects, the techniques described herein relate to a system, wherein the fault information includes a machine identification, a total number of machine hours, and a fault code.

In some aspects, the techniques described herein relate to a system, wherein the graphical user interface further includes a listing of each fault event currently displayed on the map.

In some aspects, the techniques described herein relate to a system, wherein the fault event information, the location information, and the severity information are received from a corresponding one of the plurality of machines.

In some aspects, the techniques described herein relate to a system, wherein the fault event information corresponds to faults observed during a selectable time period.

In some aspects, the techniques described herein relate to one or more non-transitory computer-readable media storing computer-executable instructions that, when executed by one or more processors, cause the one or more processors to perform operations including: receiving fault event information for a plurality of machines dispersed within a selected geographic region; receiving location information indicating where one or more of the fault events occurred; receiving severity information for the one or more fault events, wherein the severity information includes an indication of high, medium, or low severity; and presenting on a display device a graphical user interface including: a map representing at least a portion of the geographic region; and at least one fault cluster indicator positioned on the map representing fault events that occurred on the plurality of machines located within a selected cluster distance; wherein the fault cluster indicator indicates the number of high severity events as a percentage of combined high and medium severity events as a corresponding portion of a ring and wherein the total number of fault events represented by the fault cluster indicator is numerically indicated in the center of the ring.

In some aspects, the techniques described herein relate to a non-transitory computer-readable media, wherein the graphical user interface further includes at least one fault marker that is located outside the selected cluster distance, wherein the fault marker includes a severity indicator.

In some aspects, the techniques described herein relate to a non-transitory computer-readable media, further including receiving a selection of the at least one fault marker and in response to receiving the selection of the at least one fault marker displaying the corresponding fault information overlayed on the map.

In some aspects, the techniques described herein relate to a non-transitory computer-readable media, wherein the fault information includes a machine identification, a machine hours, and a fault code.

In some aspects, the techniques described herein relate to a non-transitory computer-readable media, wherein the graphical user interface further includes a listing of each fault event currently displayed on the map.

In some aspects, the techniques described herein relate to a non-transitory computer-readable media, wherein the fault event information, the location information, and the severity information are received from a corresponding one of the plurality of machines.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
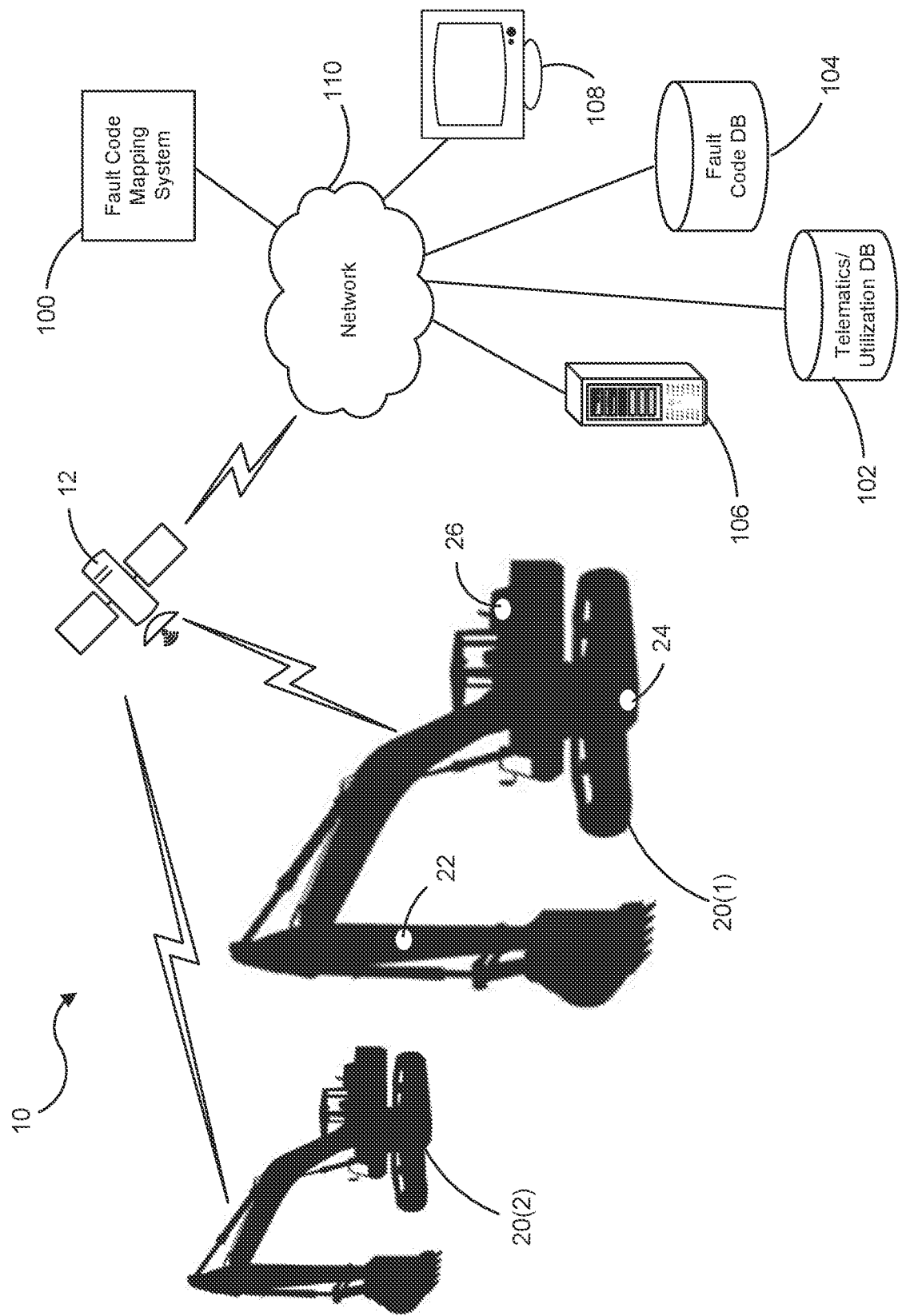
FIG. 1 is a diagram illustrating an overview of an environment in which some implementations of a fleet level fault code mapping system can operate according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Fleet managers need the ability to visualize where fault codes are occurring at the fleet level. While location data is provided when fault codes are reported, fault codes have traditionally been provided in a list view, with only an address link. Additionally, mapping capabilities for faults at the fleet level have been confined at the asset level rather than the fault level, and are displayed by the location of the asset, not the location of the faults themselves. This may be useful to identify problem assets, but it does not allow fleet managers to easily understand where faults are contextually occurring, and as such evaluate and address geography-based trends.

The disclosed technology provides fleet level mapping of fault code locations. Rather than placing indicators (e.g., pins) on the reported location of the asset and providing supplementary fault code information, the system provides a fault code location view that focuses on the faults themselves. In other words, the locations of the pins on the map are based on the specific geographic location where faults occurred independent of the assets current location. Each pin provides fault code information: severity, description, source, date, time, and location, as well as information about the asset reporting the fault (assetID/SN, make, model, hours, and odometer as well as current status and last reported location). This allows fleet managers to understand faults in the context of where they are occurring. Additionally, the map clusters faults that have occurred in the same geographic area. This allows fleet managers to evaluate geography-based trends, take corrective actions to address problem areas within their jobsites, and/or identify opportunities for operator training based on the types of fault codes frequently triggered in the same location.

FIG. 1 illustrates an environment 10 in which some implementations of a fault code mapping system 100 can operate according to embodiments of the disclosed technology. The system environment 10 can include multiple machines, such as excavators 20(1) and 20(2), a satellite 12, telematics/utilization database 102, a fault code database 104, a telematics processing system 106, a display 108, and a network 110. The fault code mapping system 100 can be connected to the telematics/utilization database 102, the fault code database 104, the telematics processing system 106, and the display 108, via network 110. The telematics/utilization database 102, the fault code database 104, and the telematics processing system 106 can receive fault codes and telematics data from the excavators 20(1) and 20(2) via satellite 12. The telematics data can include machine run time, idle time, and machine identification information including e.g., type and model number. The telematics data can also include sensor data from the excavators, such as from a pressure sensor 22, a vibration sensor 24, and a temperature sensor 26, to name a few.

In some embodiments, the telematics processing system 106 determines a machine utilization pattern for the machines based on the telematics data. For example, a machine learning model (such as a neural network) can be applied to estimate each machine's utilization pattern based on telematics data (i.e., telemetry data). As an example, an excavator can have a use pattern of activities including e.g., 50% mass excavation, 20% grading, and 30% tracking (i.e., traveling from place to place). In some embodiments, a utilization model can use mathematical models that classify equipment activity or application frequencies, which can include regression, support vector machines, and neural nets, depending on the level of detail and complexity required. These models may differentiate between, for example, mass excavation, dirt moving, trenching, scraping, grading, loading, tracking, or idle time. Models may supplement standard telematics data with additional sensors to measure the intensity of use. In some embodiments, the resulting machine utilization patterns, or activity data, can be provided to the fault code mapping system 100 in addition to run time, idle time, fault codes, and machine identification information.

The fault code mapping system 100 can be configured to receive fault event information, location information, and fault severity information for a plurality of machines dispersed within a selected geographic region from the machines themselves or via one or more databases, such as the telematics/utilization database 102 and/or the fault code database 104. The fault code mapping system 100 can cluster the fault code events based on fault type, severity, and geographic location, for example. The system 100 can then present a graphical user interface (GUI) on a display device 108 for review by a user, e.g., a fleet manager.

Figure 2:
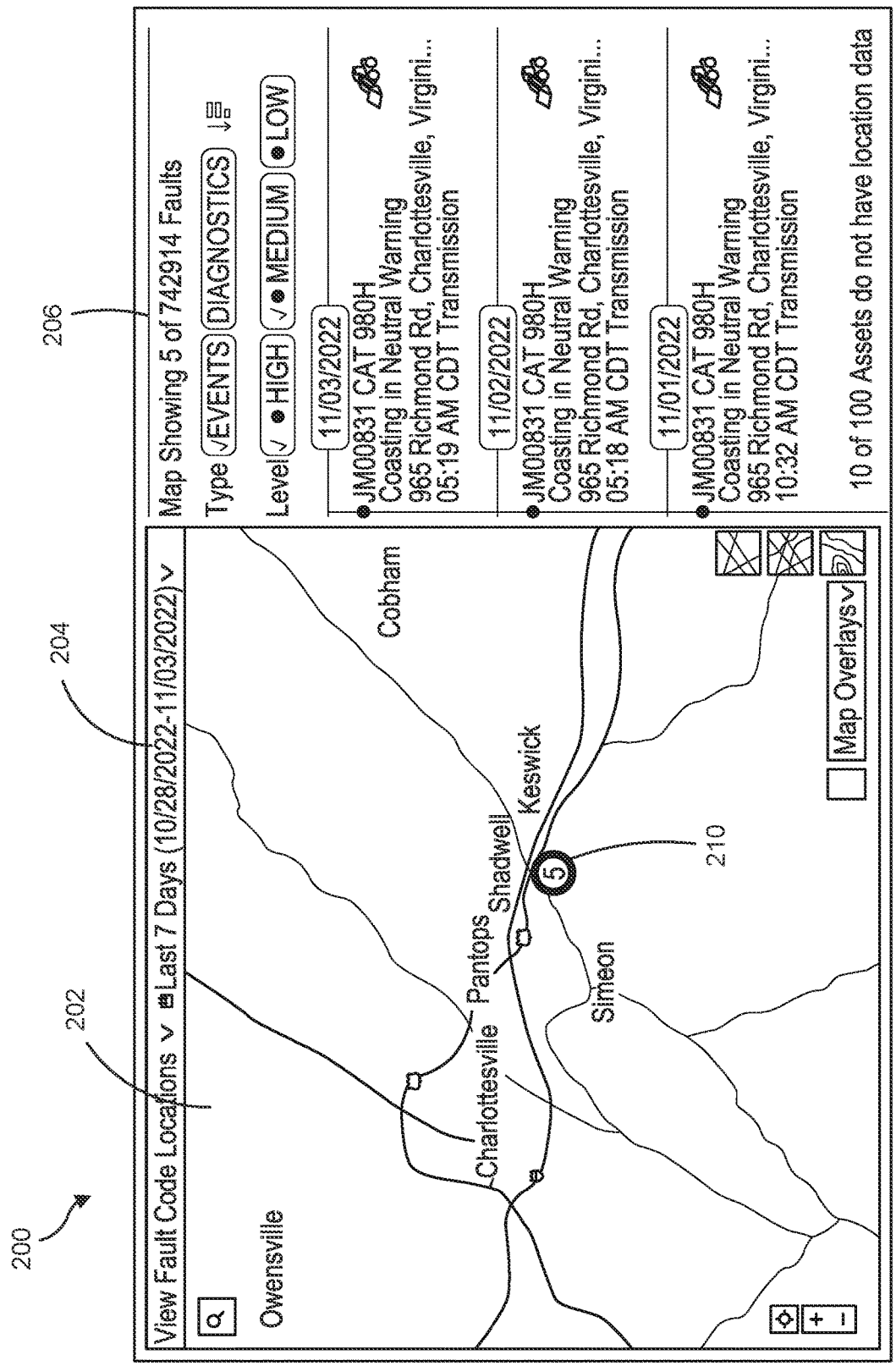
FIG. 2 is an illustration of a graphical user interface for machine usage visualization according to some embodiments of the disclosed technology.

With reference to FIG. 2, the fault code mapping system 100 is configured to output a graphical user interface (GUI) 200 to a suitable display device, such as display device 108 (FIG. 1). As shown in the figure, a map 202 representing at least a portion of the geographic region is presented on the GUI 200. The system clusters fault events that occurred on the plurality of machines at a location within a selected cluster distance. At least one fault cluster indicator 210 is positioned on the map 202 representing the clustered faults. As explained more fully below with respect to FIG. 5, the indicator 210 can indicate the number of faults in the cluster as well as the severity of the faults. In some embodiments, a date range 204 can be selected. Thus, the displayed fault event information (i.e., fault cluster indicator 210) corresponds to faults observed during the selected time period. In addition to map portion 202, the GUI 200 can also include a list portion 206 of each fault event currently displayed on the map along with machine identification and a location where the fault occurred.

Figure 3:
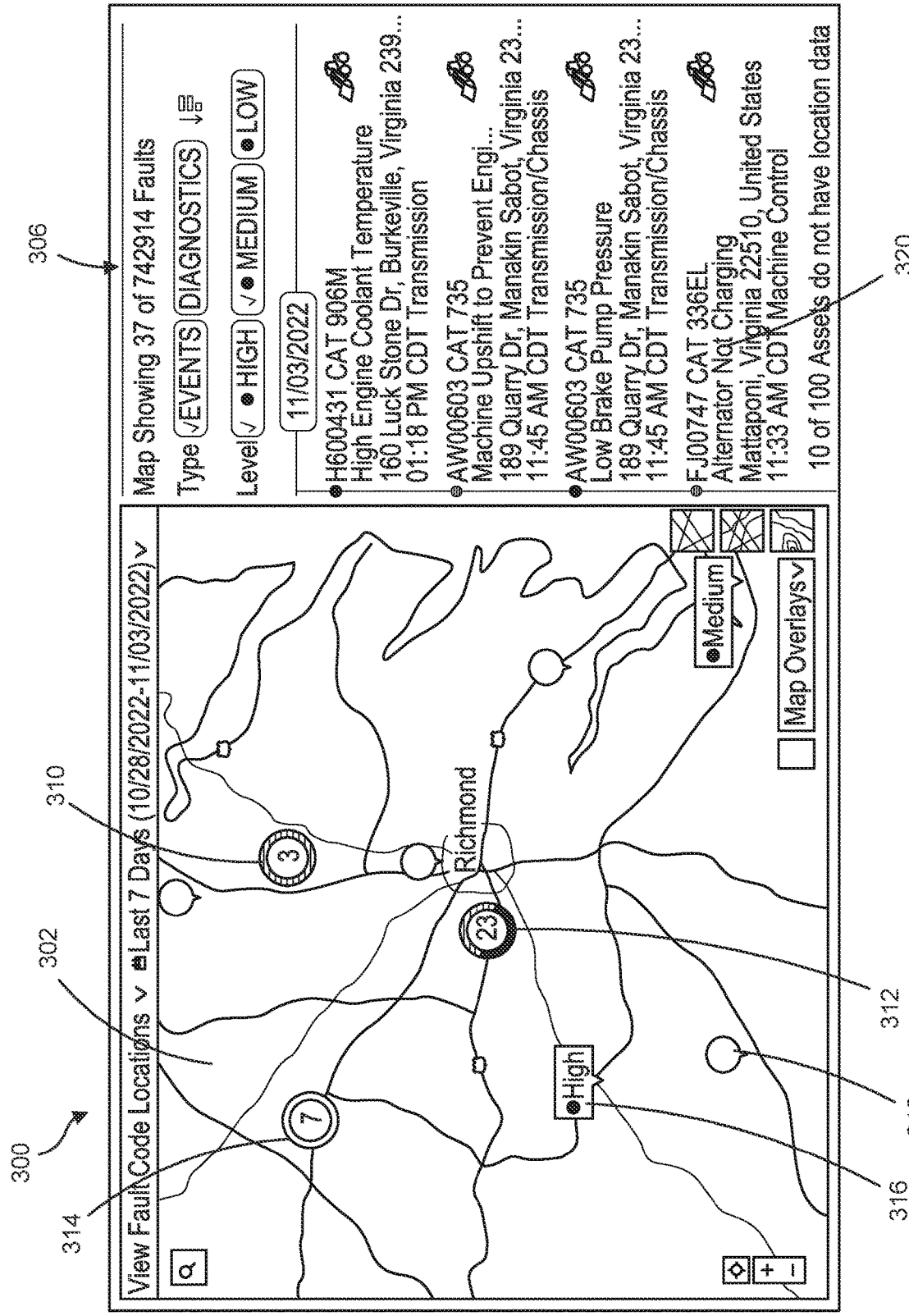
FIG. 3 is an enlarged view of a portion of the graphical user interface for machine usage visualization.

FIG. 3 illustrates another example of a GUI 300 including map 302 having multiple fault cluster indicators 310, 312, and 314. The fault cluster indicators positioned on the map represent fault events that occurred on the plurality of machines located within a selected cluster distance (e.g., a 20 mile diameter) of the indicator, with the indicator centrally located with respect to the fault event locations. Similar to GUI 200 discussed above, the GUI 300 can include a list portion 306 including fault information 320. The GUI 300 can also include service locations, such as location 318, and fault markers, such as marker 316.

Figure 4:
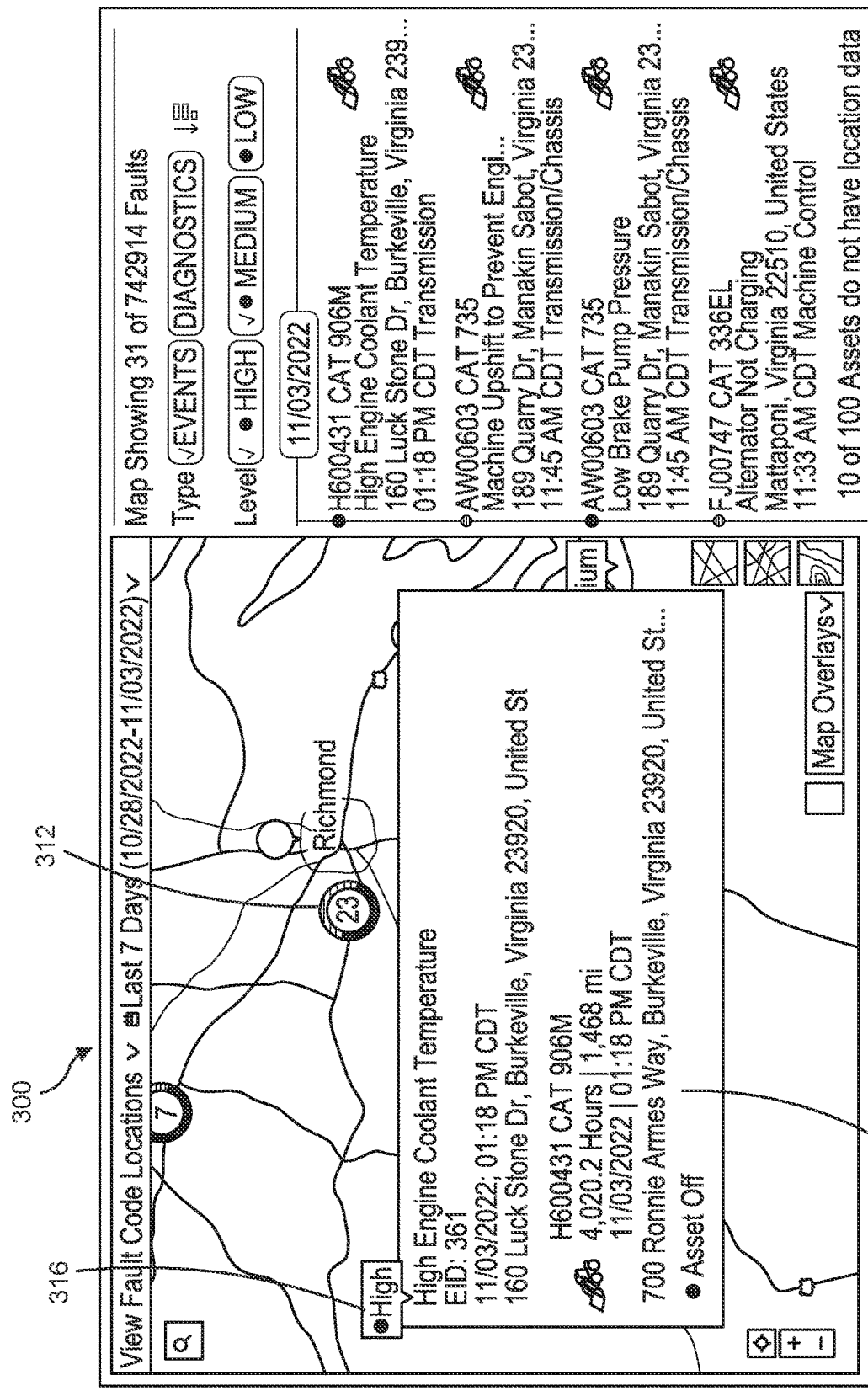
FIG. 4 is an enlarged view of the graphical user interface for machine usage visualization.

With further reference to FIG. 4, as noted above, the GUI 300 can include fault markers, such as marker 316, that are located outside the range (e.g., distance) of each fault cluster indicator. For example, the fault marker 316 is outside the range of the selected distance corresponding to fault cluster indicator 312. When a fault marker indicator 316 is selected or hovered over, the system displays the corresponding fault information overlayed on the map in a pop-up window 322, for example. In some embodiments, the fault marker can include a severity indicator in the form of text and or a color coded dot, as shown.

Figure 5:
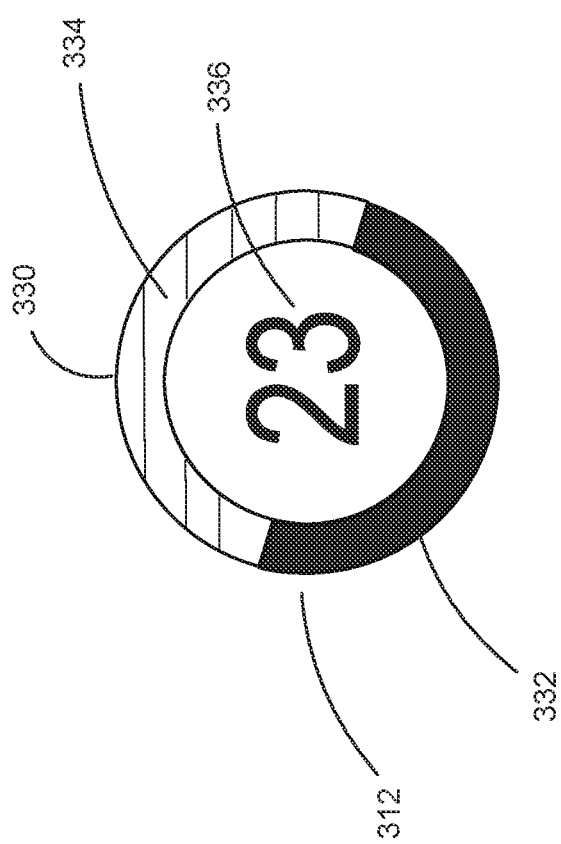
FIG. 5 is an enlarged view of the fault cluster indicator shown in FIGS. 3 and 4 according to some embodiments of the disclosed technology.

As shown in FIG. 5, in some embodiments, each fault cluster indicator, such as indicator 312, indicates the number of high severity events as a percentage of combined high and medium severity events as a corresponding portion of a ring 330. For example, in the depicted embodiment, portion 332 is the high severity portion and portion 334 is the medium severity portion. The total number of fault events 336 represented by the fault cluster indicator is numerically indicated in the center of the ring 330. In some embodiments, the different portions of the ring can be color coded. In some embodiments, when a user selects or hovers over a fault cluster indicator 312, a pop-up window can appear displaying date, high severity percentage, medium severity percentage, and location, for example. In some embodiments, the fault cluster indicator can comprise a pie chart, a bar graph divided into high and medium severities, or other suitable graphical arrangement. The fault cluster indicators provide an efficient way for a user to quickly compare performance among like machines on a jobsite to help identify problems. This condensed display arrangement also provides tools for the user to drill down in order to identify what might be causing fault codes and how to correct them. In some embodiments, selecting a fault cluster indicator causes the system to zoom in on the map and break out individual fault events and smaller clusters.

Figure 6:
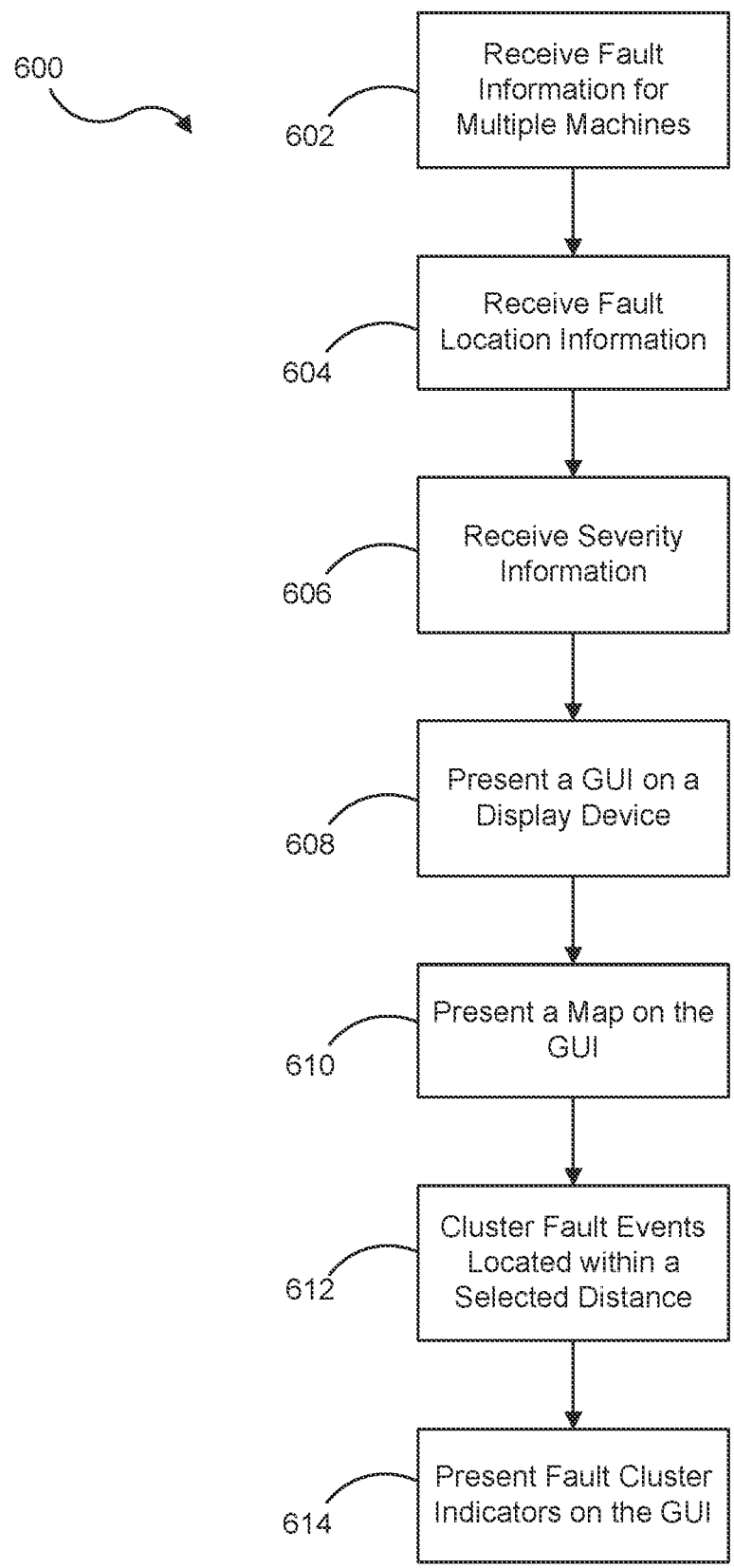
FIG. 6 is a flow diagram showing a method for fleet level fault code mapping according to some embodiments of the disclosed technology.

FIG. 6 is a flow diagram showing a method 600 for machine fault code location mapping according to some embodiments of the disclosed technology. The method 600 can include receiving fault event information for a plurality of machines dispersed within a selected geographic region at step 602. At step 604, location information is received corresponding to the received fault event information. The location information can indicate the locations where corresponding fault events occurred. At step 606, severity information is received for corresponding fault events. The severity information can include an indication of high, medium, or low severity. A graphical user interface (GUI) is presented on a display device at step 608. At step 610, a map representing at least a portion of the geographic region is presented on the GUI. At step 612, the system clusters fault events that occurred on the plurality of machines located within a selected cluster distance. At least one fault cluster indicator is positioned on the map representing the clustered faults at step 614. In some embodiments, the fault cluster indicator indicates the number of high severity events as a percentage of combined high and medium severity events as a corresponding portion of a ring and wherein the total number of fault events represented by the fault cluster indicator is numerically indicated in the center of the ring.

In some embodiments, the graphical user interface further comprises at least one fault marker that is located outside the selected cluster distance, wherein the fault marker includes a severity indicator. The method 600 can also include receiving a selection of the at least one fault marker and in response, displaying the corresponding fault information overlayed on the map. The fault information can include a machine identification, a total number of machine hours, and a fault code, for example. In some embodiments, the graphical user interface can further comprise a listing of each fault event currently displayed on the map. The fault event information, the location information, and the severity information can be received from a corresponding one of the plurality of machines. The fault event information can correspond to faults observed during a selectable time period.

In some embodiments, the disclosed systems and methods can automatically flag high-occurrence fault codes. The system can determine fault codes for which there are multiple occurrences and filter for the fault code that has the most occurrences. The high-occurrence fault code can then be displayed and clustered on the map to provide a fleet manager context for the multiple occurrences. For example, if all of the faults are occurring at a particular worksite, or near a geographic feature, and/or a local weather condition (e.g., rain). All of which could have a bearing on why the faults are occurring. For example, an over speed fault can be the result of a particular hill (i.e., geographic feature) in a work site. Thus, the appropriate resolution may be to regrade the hill or reroute machines to avoid the hill. As another example, wheel slip faults (indicating tire wear) can be the result of traction loss due to rain (i.e., weather condition) at a certain location. And, faults that could be related to a worksite include long hours at that site, temperature conditions, operating training level, etc. Thus, the system can automatically flag and provide context for high occurrence fault codes to assist the fleet manager to diagnose and take appropriate actions.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
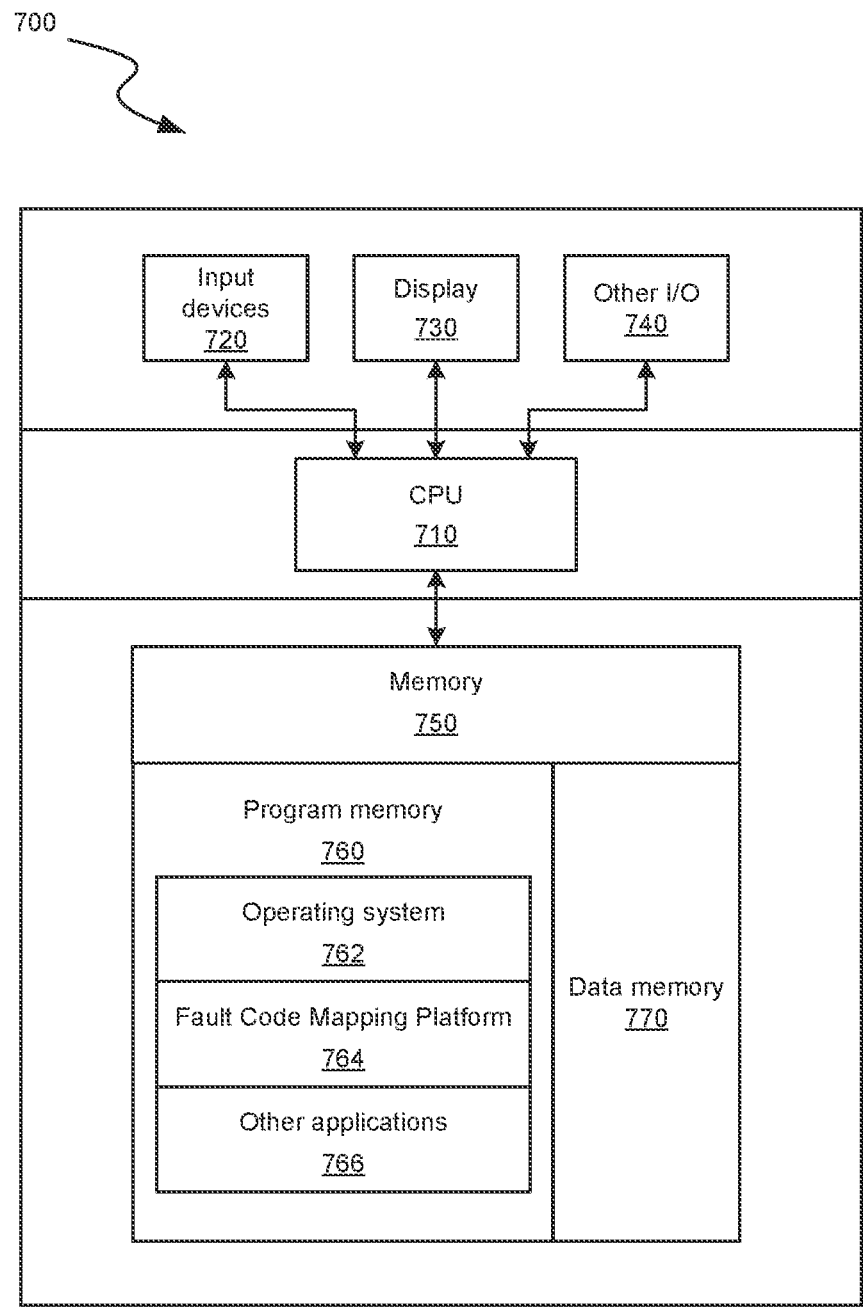
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700, for example. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, fault code mapping platform 764, and other application programs 766. Memory 750 can also include data memory 770 that can include database information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 8:
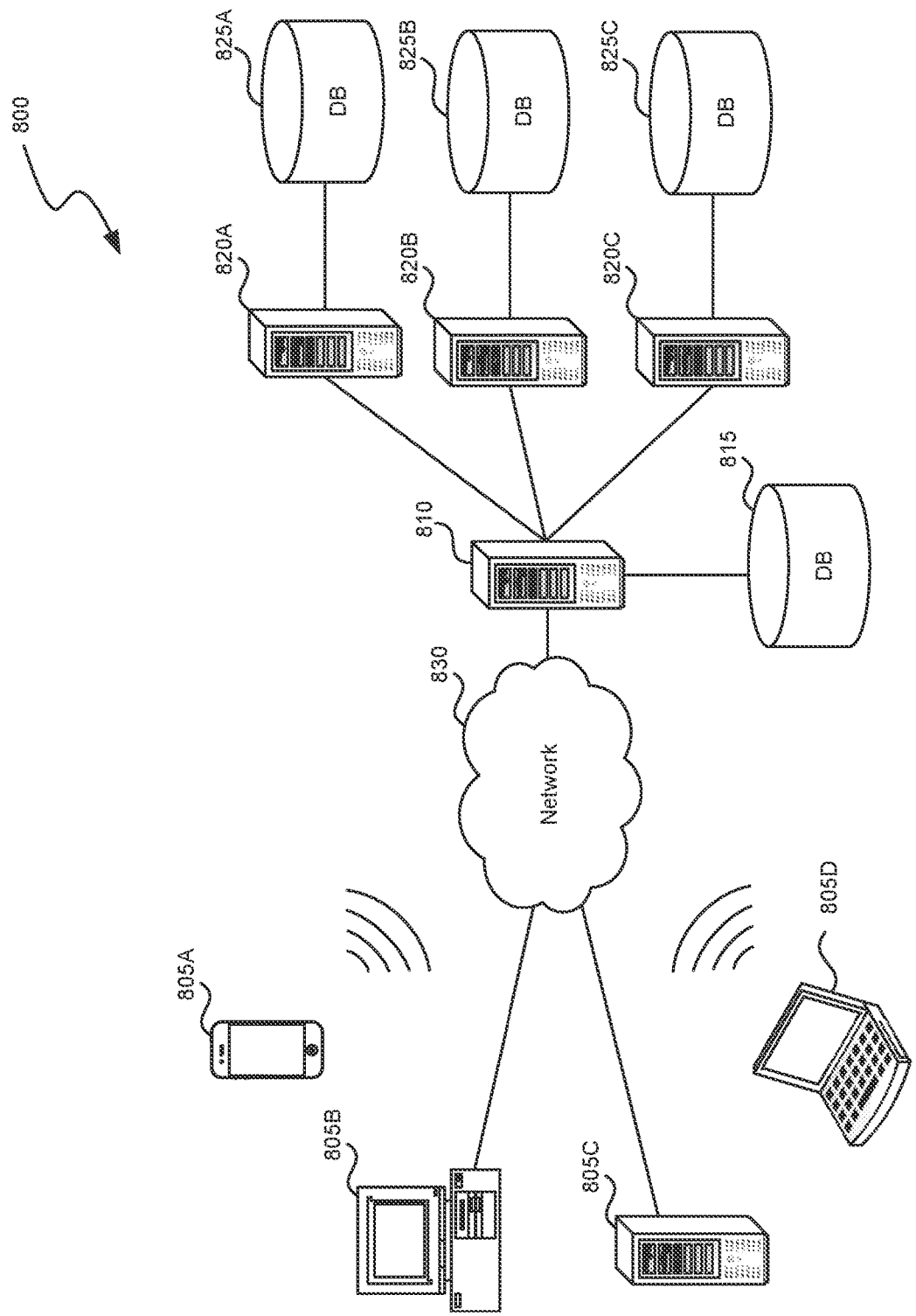
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
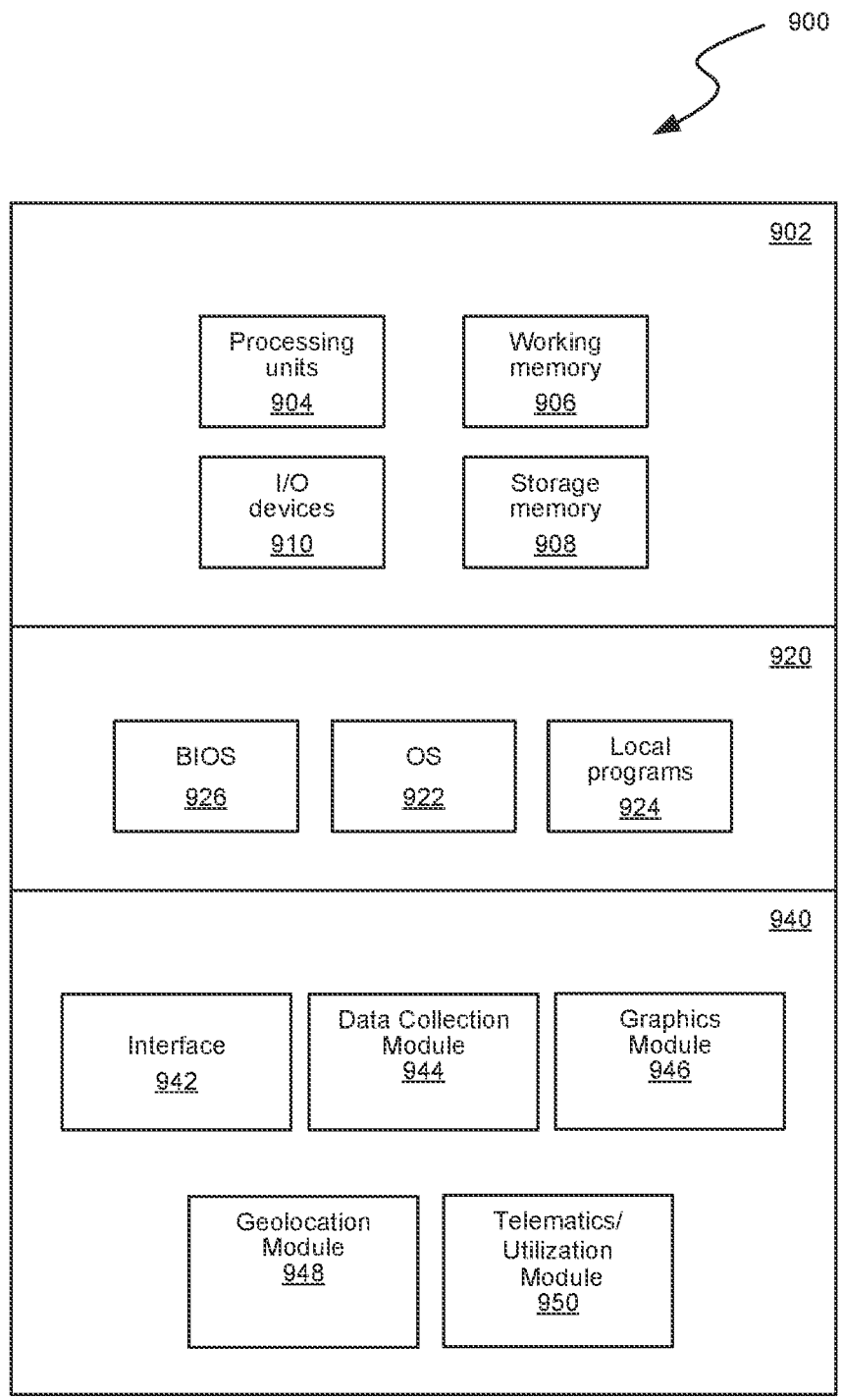
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a Data Collection Module 944, a Graphics Module 946, a Geolocation Module 948, a Telematics/Utilization Module 950, and components that can be used for transferring data and controlling the specialized components, such as Interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a fault code mapping system can include a Data Collection Module 944, a Graphics Module 946, a Geolocation Module 948, and a Telematics/Utilization Module 950 (FIG. 9). In operation, the Data Collection Module 944 can receive telematics data, including e.g., fault codes and severity, from the Telematics/Utilization Module 950. The Telematics/Utilization Module 950 can receive and process telematics data from various machines such as trucks, bulldozers, and excavators. The telematics data can include machine run time, idle time, fault codes, and machine identification information including e.g., type and model number. In some embodiments, the Geolocation Module 948 can determine and provide fault event location information to the Data Collection Module 944. In some embodiments, the Data Collection Module 944 receives fault event location and severity information from different domains or databases in addition to or in lieu of from the Geolocation Module 948. The Data Collection Module 944 combines all of the data and provides it to the Graphics Module 946, which outputs a GUI for presentation on a display device that includes the fault cluster indicators.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for earthmoving machine fault location mapping, the method comprising:
   receiving, from a plurality of sensors associated with a plurality of earthmoving machines, fault event information for the plurality of earthmoving machines dispersed within a selected geographic region;
   receiving location information corresponding to the received fault event information;
   receiving severity information corresponding to the received fault event information, wherein the severity information comprises an indication of high, medium, or low severity; and
   presenting on a display device a graphical user interface comprising:
      a map representing at least a portion of a geographic region; and
      at least one fault cluster indicator positioned on the map representing fault events that occurred on the plurality of earthmoving machines located within a selected cluster distance;
      wherein the at least one fault cluster indicator indicates number of high severity events as a percentage of combined high and medium severity events as a corresponding portion of a ring and wherein the total number of fault events represented by the at least one fault cluster indicator is numerically indicated in a center of the ring;
      receiving, by the graphical user interface (GUI), selection of the at least one fault cluster indicator presented on the map; and
      based on the selection, generating a window overlaid on the map associated with the GUI displaying a date, a high severity percentage, a medium severity percentage, and a location associated with the fault event information of an earthmoving machine.

2. The method of claim 1, wherein the graphical user interface further comprises at least one fault marker that is located outside the selected cluster distance, wherein the at least one fault marker includes a severity indicator.

3. The method of claim 2, further comprising receiving a selection of the at least one fault marker and in response to receiving the selection of the at least one fault marker displaying corresponding fault information overlayed on the map.

4. The method of claim 3, wherein the corresponding fault information includes a earthmoving machine identification, a total number of earthmoving machine hours, and a fault code.

5. The method of claim 1, wherein the graphical user interface further comprises a listing of each fault event currently displayed on the map.

6. The method of claim 1, wherein the fault event information, the location information, and the severity information are received from a corresponding one of the plurality of earthmoving machines.

7. The method of claim 1, wherein the fault event information corresponds to faults observed during a selectable time period.

8. An earthmoving machine fault location mapping system, comprising:
   one or more processors; and
   one or more memory devices having stored thereon instructions that when executed by the one or more processors cause the one or more processors to:
      receive, from a plurality of sensors associated with a plurality of earthmoving machines, fault event information for the plurality of earthmoving machines dispersed within a selected geographic region;

receive location information indicating where a fault events occurred;

receive severity information for the fault events, wherein the severity information comprises an indication of high, medium, or low severity; and present on a display device a graphical user interface comprising:

a map representing at least a portion of the geographic region; and at least one fault cluster indicator positioned on the map representing fault events that occurred on the plurality of earthmoving machines located within a selected cluster distance;

wherein the at least one fault cluster indicator indicates number of high severity events as a percentage of combined high and medium severity events as a corresponding portion of a ring and wherein total number of fault events represented by the at least one fault cluster indicator is numerically indicated in center of the ring;

receiving, by the graphical user interface (GUI), selection of the at least one fault cluster indicator presented on the map; and based on the selection, generating a window overlaid on the map associated with the GUI displaying a date, a high severity percentage, a medium severity percentage, and a location associated with the fault event information of an earthmoving machine.

9. The earthmoving machine fault location mapping system of claim 8, wherein the graphical user interface further comprises at least one fault marker that is located outside the selected cluster distance, wherein the at least one fault marker includes a severity indicator.

10. The earthmoving machine fault location mapping system of claim 9, further comprising receiving a selection of the at least one fault marker and in response to receiving the selection of the at least one fault marker displaying the corresponding fault information overlayed on the map.

11. The earthmoving machine fault location mapping system of claim 10, wherein the corresponding fault information includes a earthmoving machine identification, a total number of earthmoving machine hours, and a fault code.

12. The earthmoving machine fault location mapping system of claim 8, wherein the graphical user interface further comprises a listing of each fault event currently displayed on the map.

13. The earthmoving machine fault location mapping system of claim 8, wherein the fault event information, the location information, and the severity information are received from a corresponding one of the plurality of earthmoving machines.

14. The earthmoving machine fault location mapping system of claim 8, wherein the fault event information corresponds to faults observed during a selectable time period.

15. A non-transitory computer-readable medium storing computer-executable instructions that, when executed by one or more processors, cause the one or more processors to perform operations comprising:

receiving, from a plurality of sensors associated with a plurality of earthmoving machines, fault event information for the plurality of earthmoving machines dispersed within a selected geographic region;

receiving location information indicating where one or more of the fault events occurred;

receiving severity information for the one or more fault events, wherein the severity information comprises an indication of high, medium, or low severity; and presenting on a display device a graphical user interface comprising:

a map representing at least a portion of a geographic region; and at least one fault cluster indicator positioned on the map representing the one or more fault events that occurred and that are associated with the plurality of earthmoving machines located within a selected cluster distance;

wherein the at least one fault cluster indicator indicates number of high severity events as a percentage of combined high and medium severity events as a corresponding portion of a ring and wherein the total number of fault events represented by the at least one fault cluster indicator is numerically indicated in a center of the ring;

receive, by the graphical user interface (GUI), selection of the at least one fault cluster indicator presented on the map; and based on the selection, generate a window overlaid on the map associated with the GUI displaying a date, a high severity percentage, a medium severity percentage, and a location associated with the fault event information of an earthmoving machine.

16. The non-transitory computer-readable medium of claim 15, wherein the graphical user interface further comprises at least one fault marker that is located outside the selected cluster distance, wherein the at least one fault marker includes a severity indicator.

17. The non-transitory computer-readable medium of claim 16, further comprising receiving a selection of the at least one fault marker and in response to receiving the selection of the at least one fault marker displaying a corresponding fault information overlayed on the map.

18. The non-transitory computer-readable medium of claim 17, wherein the corresponding fault information includes a earthmoving machine identification, a earthmoving machine hours, and a fault code.

19. The non-transitory computer-readable medium of claim 15, wherein the graphical user interface further comprises a listing of each fault event currently displayed on the map.

20. The non-transitory computer-readable medium of claim 15, wherein the fault event information, the location information, and the severity information are received from a corresponding one of the plurality of earthmoving machines.

* * * * *